United States Patent [19]

Wanha

[11] Patent Number: 5,368,802
[45] Date of Patent: Nov. 29, 1994

[54] HEAT STAKE PRESS AND ALIGNER AND METHOD OF USE

[75] Inventor: Christopher D. Wanha, Costa Mesa, Calif.

[73] Assignee: ITT Corporation, Secaucus, N.J.

[21] Appl. No.: 60,665

[22] Filed: May 13, 1993

[51] Int. Cl.5 .......................................... B29C 65/18
[52] U.S. Cl. ............................... 264/249; 29/464;
29/243.5; 29/509; 425/392; 425/403
[58] Field of Search ............... 264/249; 425/383, 392,
425/403, 182, 193, 112, 518; 29/243.5, 464, 466,
509

[56] References Cited

U.S. PATENT DOCUMENTS

| | | | |
|---|---|---|---|
| 3,419,297 | 12/1968 | Diepenhorst et al. | 287/189.36 |
| 3,791,018 | 2/1974 | Johnston et al. | 29/471.1 |
| 3,832,432 | 8/1974 | Parry | 264/249 |
| 4,195,219 | 3/1980 | Friese | 219/388 |
| 4,633,559 | 1/1987 | Loren | 29/243.5 |
| 4,767,298 | 8/1988 | Bocchicchio et al. | 425/112 |
| 5,018,957 | 5/1991 | Assink et al. | 425/112 |
| 5,046,953 | 9/1991 | Shreeve et al. | 439/66 |
| 5,227,173 | 7/1993 | Sherwood | 264/249 |

Primary Examiner—Jay H. Woo
Assistant Examiner—Robert B. David
Attorney, Agent, or Firm—Thomas L. Peterson

[57] ABSTRACT

A heat stake press apparatus is described for fixing a connecter to a circuit board by heat staking pegs of the connector, which facilitates alignment of the circuit board holes with forming tips in a low cost press. A pair of aligners (110, 112, FIG. 6) is provided that are each mounted at a forward edge of the board in alignment with a peg hole (22) of the board. The board is mounted on support guides (62, 64) of the press, and the board is slid forwardly until a pair of forming tips (52) are received in slots (124) of the aligners to sidewardly align the board. The support guides are then moved sidewardly so board guide pins (74A, 76A, FIG. 2) move against side edges (80, 82) of the board. Thereafter, the aligners are removed, a connector (14) is placed on the board with its pegs projecting down through the board holes, and the board is again placed in the press on the support guides. A pressing mechanism (90) of the press is then operated to move an arbor (92) down against the connector to push down the connector and circuit board until the connector pegs are pushed down against the hot forming tips (52) that heat stake them. During downward movement of the connector and board, the support guides move down towards bases (100, 102) that support them by springs (106).

11 Claims, 4 Drawing Sheets

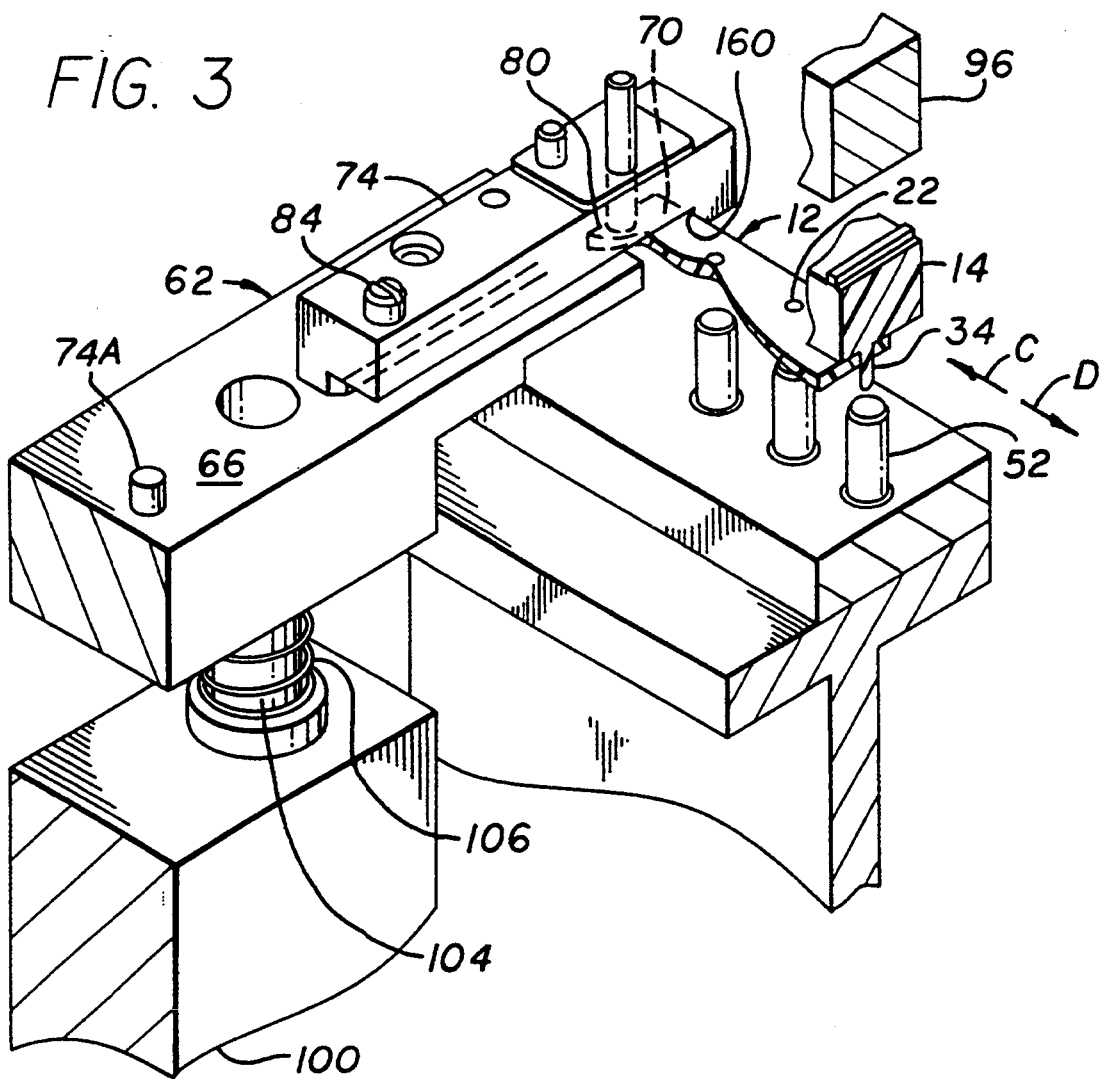
FIG. 3
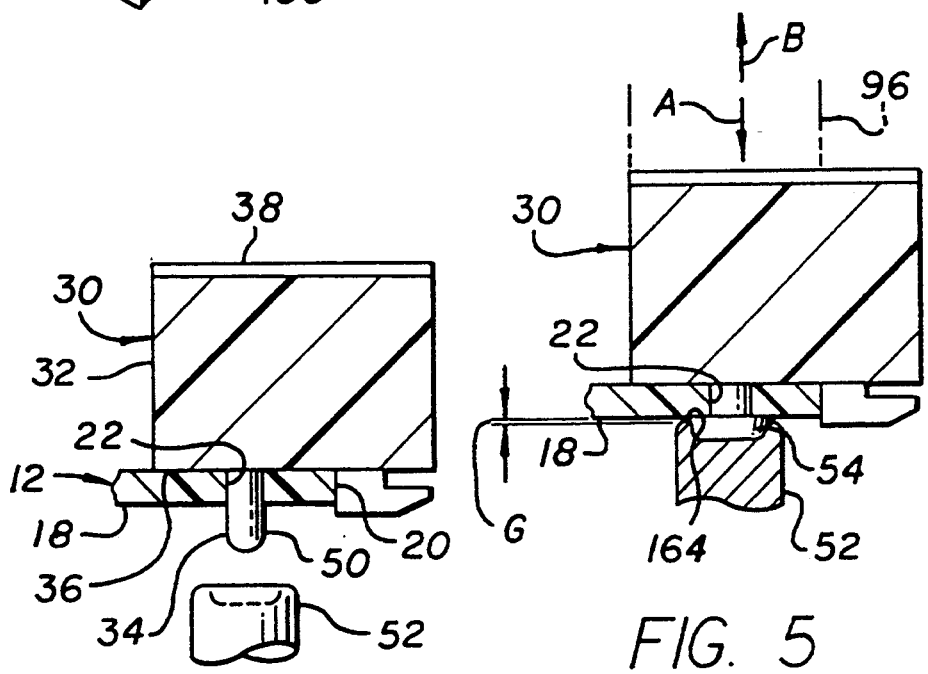
FIG. 4
FIG. 5

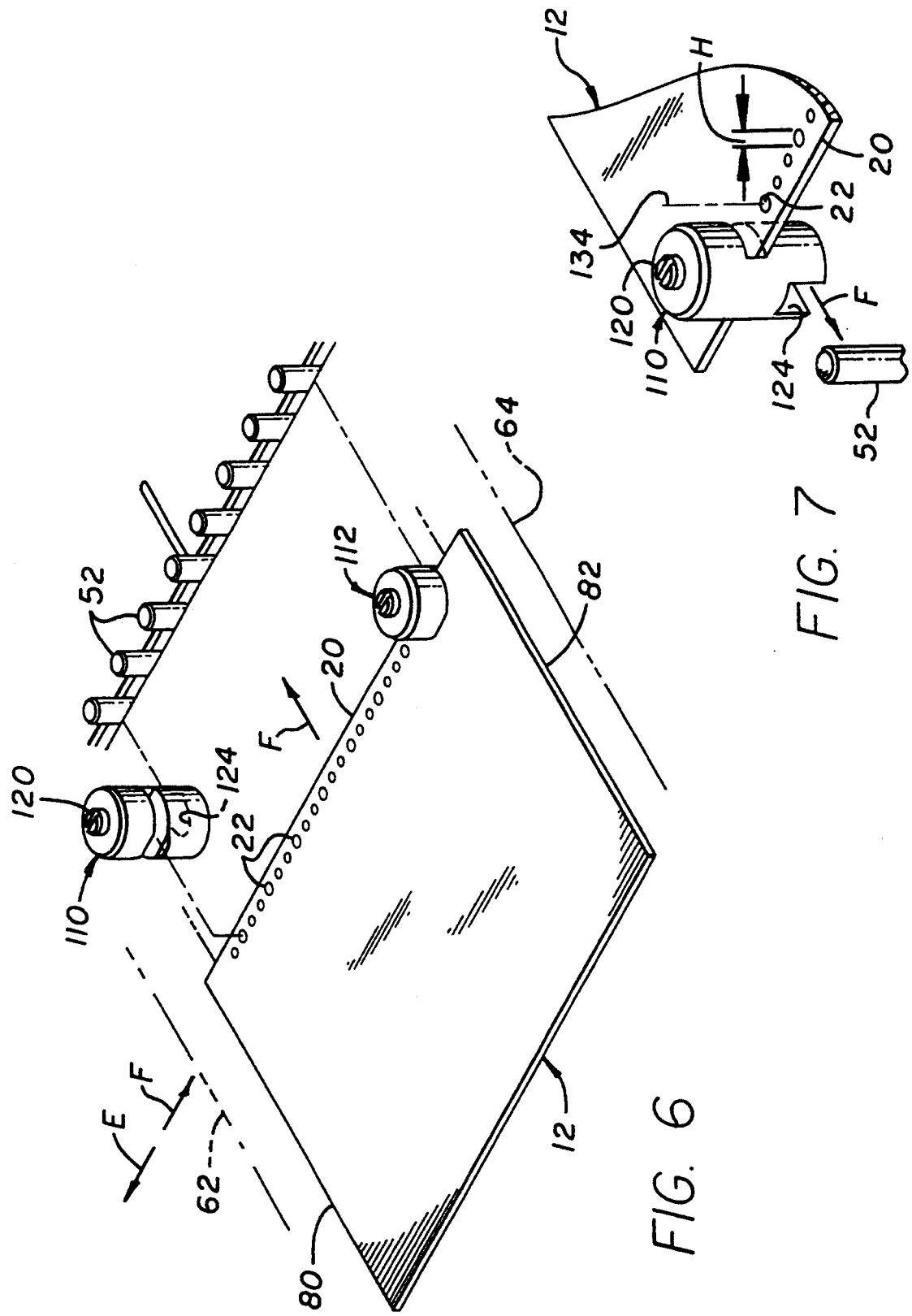

1

HEAT STAKE PRESS AND ALIGNER AND METHOD OF USE

BACKGROUND OF THE INVENTION

A common method for mounting a connector at a forward portion of a circuit board, is to provide pegs on the connector that project through board holes, and to heat stake the lower ends of the pegs. In heat staking, hot forming tips press against the ends of the peg and melt and deform them against the lower surface of the board, so the pegs and connector cannot be removed from the board. In current presses, the circuit board with the connector thereon is mounted on a platform, with board retainers movable against opposite sides of the board to accurately align it with forming tips. The hot forming tips are then moved either downwardly towards the peg of an upside-down board, or moved upwardly against the pegs of an upright board. Heating apparatus heats the forming tips and a mechanism moves the heating mechanism with hot forming tips down or up towards the circuit board. Such currently available heat stake presses are relatively expensive, so a heat stake press which could be constructed at lower cost would be of value.

When a circuit board with connector thereon is to be mounted on the heat stake press, care must be taken to carefully align the connector pegs with the forming tips. For this reason, it is often preferable to mount the circuit board upside down on the support platform, so the pegs project upwardly where they can be readily seen, and to carefully lower the tips and sidewardly adjust the circuit board to assure alignment. This alignment practice is time consuming, and it requires a more complex support platform to reliably support the circuit board or connector when the forming tips are pushed down against the pegs. Apparatus for quickly and accurately aligning the peg holes of the circuit board with the forming tips would be valuable, especially if it facilitates use of a forming press where stationary hot forming tips lay under the circuit board.

SUMMARY OF THE INVENTION

In accordance with one embodiment of the present invention, a heat stake press and alignment apparatus therefor are provided, which facilitates alignment of a circuit board with the forming tips of a heat stake press while enabling the use of a low cost heat stake press. The alignment apparatus includes at least one aligner that is mounted on the board, with a pin of the aligner received in a peg hole of the board. The aligner has a portion lying below the board which forms a slot that opens in a forward direction. With the aligners mounted on the board and the board placed on the press, the board can be moved forwardly and shifted slightly sidewardly until a pair of forming tips is fully received in the slots of the aligners. Board guide pins are then moved to abut side edges of the board. The board can be removed from the press, the aligners removed from the board, a connector placed on the board, and the board replaced on the press, with assurance that the peg holes of the board will now be accurately aligned with the forming tips.

The press can be constructed so the board support surfaces are formed on a pair of support guides that can move vertically and which are biased upwardly by springs. With the circuit board and the connector thereon in place, a pressing mechanism is operated to move down an arbor whose lower end presses against the top of the connector. As the connector and circuit board are pushed down, they push down the support guides against the spring forces. The board guide pins that abut opposite side edges of the board are mounted on the support guides, and the support guides can be moved sidewardly and locked in position to fix the positions of the board guide pins. Thus, the heated forming tips can be stationary, and the support guides which support opposite edge portions of the board move vertically.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial isometric view of the heat stake press of FIG. 2, and showing a portion of the circuit board and connector of FIG. 1 mounted thereon.

FIG. 4 is a simplified sectional side view of a portion of the apparatus of FIG. 3, with the circuit board in an up position.

FIG. 5 is a view similar to that of FIG. 4, but with the circuit board in a down position, and showing the peg fully heat staked.

FIG. 6 is an exploded view of a circuit board, a pair of aligners, and several forming tips of the heat stake press.

FIG. 7 is an isometric view of a portion of the board of FIG. 6, with one aligner thereon, and showing the manner in which the board and aligner are moved forwardly toward a forming tip.

DESCRIPTION OF THE PREFERRED EMBODIMENT

Figure 1:
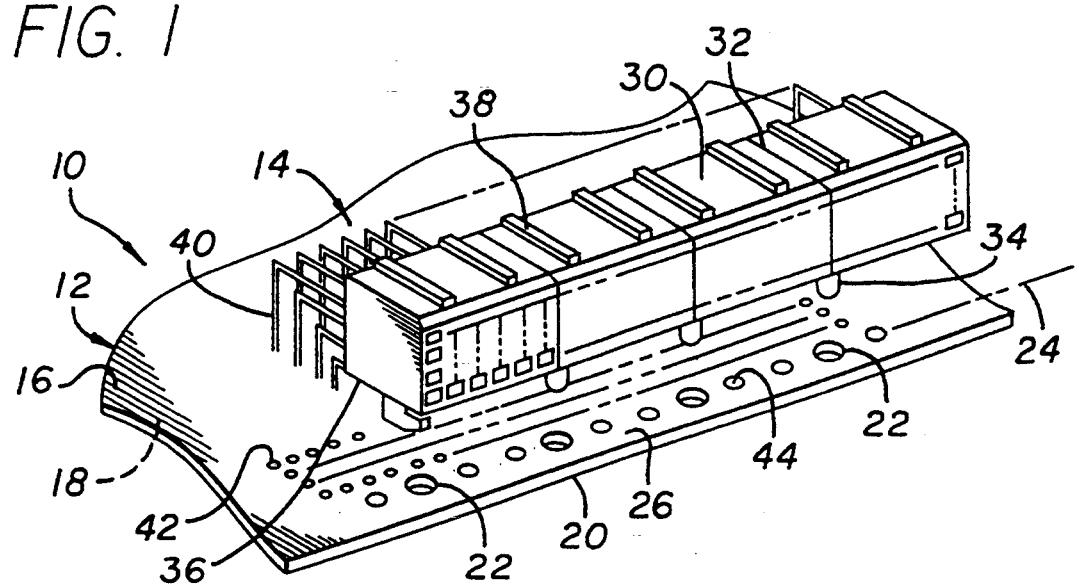
FIG. 1 is an exploded isometric view of a portion of a circuit board and of a connector which can mount thereon.

FIG. 1 illustrates a connector and circuit board arrangement 10 which includes a circuit board 12 and a connector 14 to mounted thereon. The circuit board has upper and lower faces 16, 18, a forward edge 20, and a row of peg holes 22 extending along a row line 24 at a forward edge portion 26 of the board. The connector includes a housing 30 with a main housing portion 32 and with pegs 34 depending from the main housing portion. The connector is mounted on the board by projecting the pegs 34 through the peg holes 22 in the board, with a bottom 36 of the main housing lying on the upper face of the board, and with a top 38 of the main housing spaced above the board. It is noted that this particular connector has contacts with rear end portions 40 that engage terminal 42 on the board, the connector housing also including small posts that are received in small post holes 44 in a circuit board that lie between the peg holes 22.

FIG. 4, shows the connector 30 mounted on the circuit board 12 with the pegs 34 received in the peg holes 22, and with projecting portions 50 of the pegs projecting below the board lower surface 18. The connector is permanently fastened to the board by deforming the peg projecting portions 50, using a heated forming tip 52. As shown in FIG. 5, when the connector 30 and circuit board are moved down in a direction A toward the forming tip 52, the forming tip softens the thermoplastic of the peg and forms it into a head shown at 54 which is wider than the peg hole 22 in the circuit board. The connector and board are then raised in the direction B away from the forming tips, and the connector and board assembly can be removed.

Figure 2:
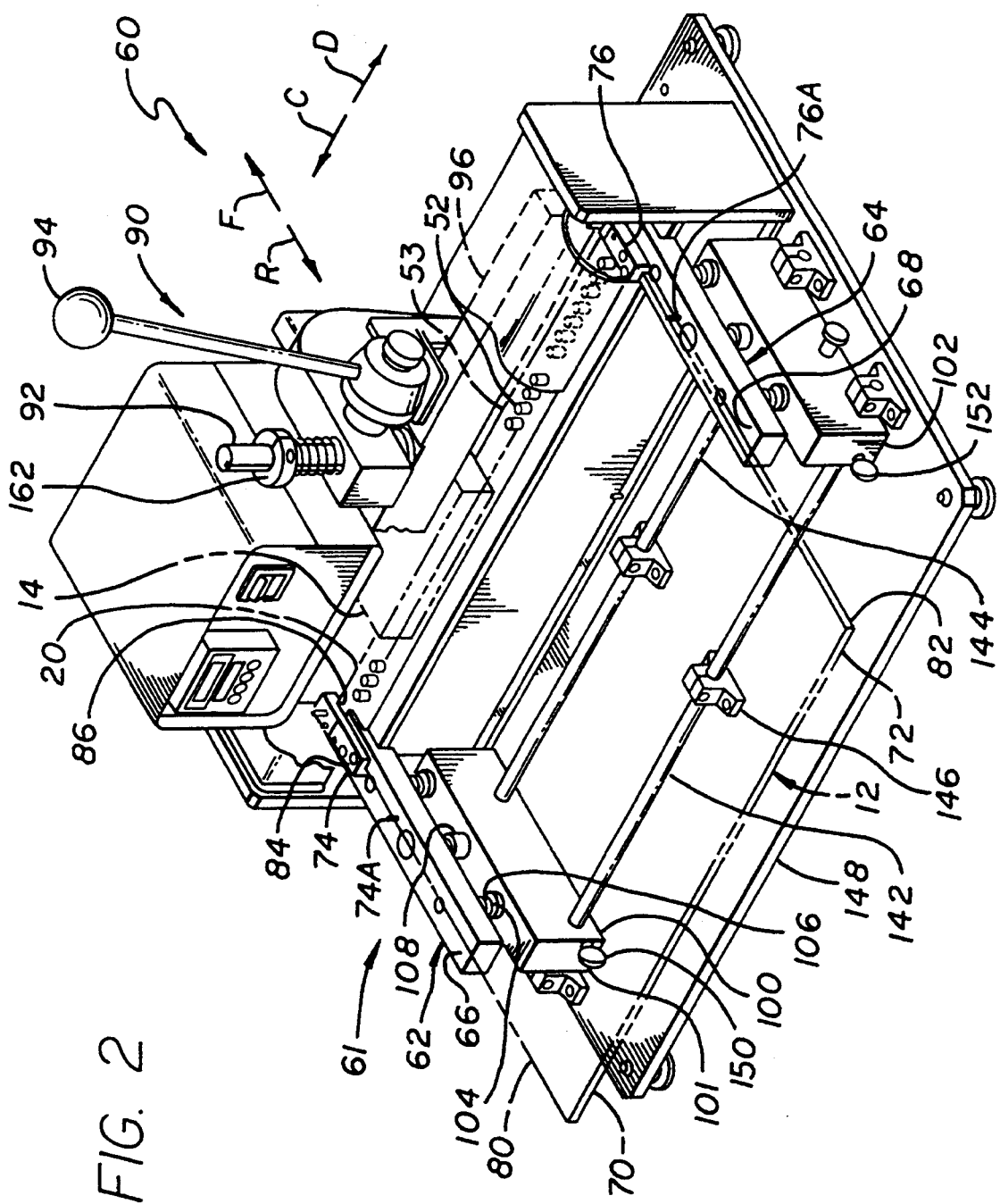
FIG. 2 is an isometric view of a heat stake press, with the circuit board shown in phantom lines thereon.

FIG. 2 shows a heat stake press 60 which performs the heat staking operation. The press includes circuit board support apparatus which includes a support platform 61 formed of a pair of support guides 62, 64 that each have a substantially horizontal support surface 66, 68. The circuit board 12 is mounted on the press by placing opposite side portions 70, 72 of the board on the support surfaces. The support guides carry board retainers 74, 76 and side edge guides in the form of guide pins 74A, 76A. The edge guides 74A, 76A abut the opposite side edges 80, 82 of the board to precisely locate the board in sideward directions indicated by arrows C, D. Each board retainer also includes a holdown 84 in the form of a downwardly biased pin which presses down the circuit board against a support surface. Each board retainer also includes a forward abutment 86 which abuts the forward edge 20 of the board to locate it in forward and rearward directions F, R.

When the board is mounted on the support guides, the peg holes of the board are aligned with the forming tips 52 of the press. The forming tips lie in a row extending along a row line 53. A pressing mechanism 90 is in the form of an arbor press, and includes an arbor 92 which is moved downwardly when a handle 94 is pivoted. A pressing bar 96 forms the lower end of the arbor, and can press down against a connector 14 on the circuit board, to move down the connector and circuit board, so the lower ends of the connector pegs move down against the forming tips 52. The pressing bar has a portion that lies sidewardly between the support guides.

When the connector and circuit board move down, the board support guides 62, 64 also move down. The support platform 61 is supported on a base structure 101 that includes two bases 100, 102. Each support guide is slidably mounted in vertical movement on a corresponding base 100, 102 by vertical guiders in the form of shafts 104. A coil spring 106 lying around each shaft, biases the support guides 62, 64 in an upward direction until the support guide hits a stop 108. The total upward force on the support guide 62, 64 applied by the four coil springs, is preferably no more than about 20 pounds, and more preferably no more than 10 pounds. This is because the downward force applied to the connector 14 and therefore through the circuit board to the support guides, should not be too high or else the circuit board might become damaged.

FIG. 3 shows a portion of a circuit board 12 positioned with one side portion 70 resting on the support surface 66 of a board support guide 62. The connector 14 lies on the board, with its pegs 34 lying over the forming tips 52. When the pressing bar 96 of the pressing mechanism is moved down, it presses the pegs against the forming tips. The peg holes 22 are easily formed at a precise predetermined spacing, as by a group of drills that drill the peg holes at a predetermined distance from the forward edge of the board.

However, when a small board is cut from a larger one in which the peg holes have been drilled, or if manufacturers do not precisely locate a side edge with respect to the nearest hole, the distance between a side edge 80 of the board and the nearest peg hole 22 may not be accurately set. Accordingly, a means is required for accurately positioning the peg holes 22 in sideward directions C, D relative to the forming tips 52 to assure their accurate alignment.

Figure 9:
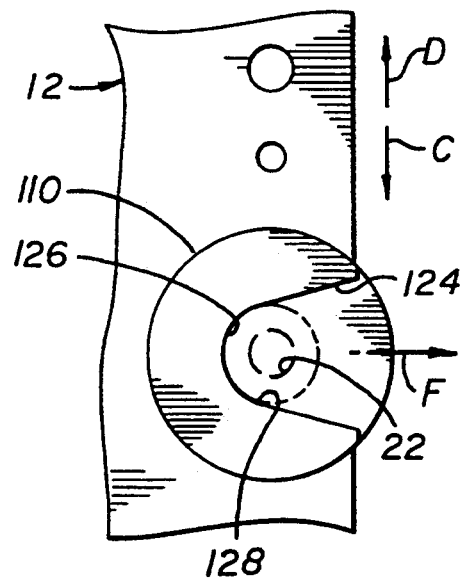
FIG. 9 is a view taken on the line 9—9 of FIG. 8, with the forming tip shown in phantom lines.
Figure 8:
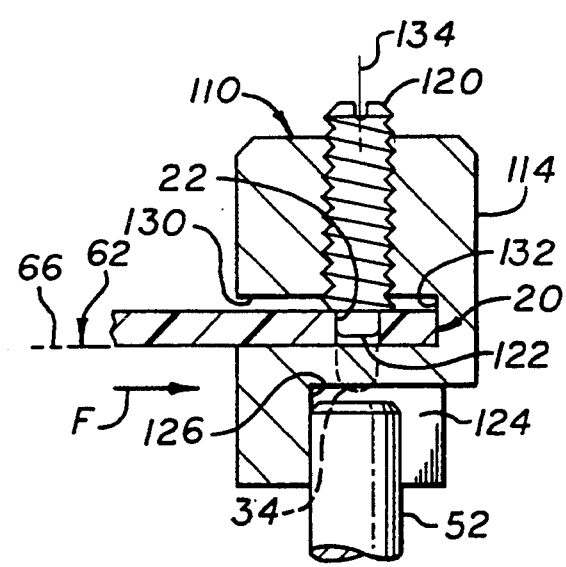
FIG. 8 is a sectional view of the board and aligner of FIG. 7, with the forming tip fully received in the aligner.

FIG. 6 shows a pair of aligners 110, 112 which can be used to align the circuit board in sideward directions C, D to assure that the peg holes 22 are accurately aligned with the forming tips 52. As shown in FIG. 8, each aligner such as 110 includes a body 114 and includes a pin 120 with a lower spring loaded pin portion 122 that is closely received in one of the peg holes 22, to accurately center the aligner on a peg hole. Each aligner such as 110 also has a slot 124 which is designed to receive a forming tip 52. When the aligner is mounted on the circuit board, the slot 124 opens in a forward direction F, so that when the board is slid forwardly in the direction F, the aligner slot 124 will receive the forming tip 52. As shown in FIG. 9, the slot 124 is tapered in width, so as the circuit board is moved forwardly it can shift sidewardly slightly to align the aligner with the forming tip. The slot has a rearward end 126 with walls lying on an imaginary circle 128 of about the same diameter as the diameter of the forming tip portion which is received in the slot. The imaginary circle 128 is coaxial with the pin and therefore the peg hole 22.

The aligner 110 has a groove 130 which is designed to receive the forward edge 20 of the board. The groove has a forward end 132 which is designed to substantially abut the board edge at spaced locations, to fix the orientation of the aligner about the axis 134 of the corresponding peg hole. To position the aligner on the board, a person unscrews the pin 120 far enough for the groove to receive the circuit board, and then places the aligner on the board. The pin 120 is then screwed down so its lower end is received in a peg hole, or a spring (not shown) in the pin may be allowed to enter the peg hole. The pin can be formed as part of the body, with other means used to hold the aligner to the circuit board.

The lower portion of the aligner body 114 extends further below the circuit board, than do the connector pegs. This allows the aligners to receive the forming tips 52, without having to push down the board support guides such as 62 against spring forces. The relative position of a board peg is shown at 34.

The circuit board with the aligners 110, 112 thereon, is laid on the board support guides 62, 64 (FIG. 2) of the heat stake press. The press is in its quiescent position (i.e. the board support guides are in their up position). The circuit board 12 is then moved forwardly in the direction F until a pair of forming tips 52 is received in the slots of the aligners. During forward movement of the board, it will shift slightly in a sideward direction to accurately align the forming tip with the rear ends of the aligner slots 124 (FIG. 6), and therefore with the peg holes 22. With the board accurately aligned with the forming tips through the aligners, the support guides 62, 64 (FIG. 2) are moved sidewardly until the board guide pins abut opposite side edges of the board.

FIG. 2 shows the manner in which the board support guides 62, 64 can be slid sidewardly until their board guide pins 74A, 76A abut corresponding side edges 80, 82 of the circuit board. As mentioned above, each support guide is mounted on a corresponding base 100, 102. Each base is supported on a pair of horizontal guiders in the form of rods 142, 144. Each rod is mounted in a stationary position on the press frame 148 by three brackets 146. Each base 100, 102 can be slid horizontally in the sideward directions C, D along the rods, and can be locked at any sideward position by a guide lock 150, 152. Thus, the separation between the board support guides 62, 64, and between the board retainers 74, 76 thereon, can be adjusted.

When the circuit board with aligners 110, 112 (FIG. 6) is placed on the support guides 62, 64, the board is slid forwardly until the aligners assure accurate alignment of the board with the forming tips 52. Applicant then adjusts the support guides 62, 64 in sideward directions. This is accomplished by loosening the guide locks 150, 152 (FIG. 2) and sliding each base 100, 102 sidewardly until each board edge guide, or guide pin 74A, 76A, abuts a corresponding circuit board side edge 80, 82. The guide locks are turned to lock the bases in position, and the circuit board then can be removed from the press and the aligners removed from the board. Then the connector 14 (FIG. 3) is placed on the board (or another board of the same dimensions), with the pegs 34 projecting downwardly through and below the peg holes 22 of the board, and the board is installed on the support guides such as 62 of the press. The side guide pins such as 74A assure that the circuit board will lie on precisely the same sideward position as it lay when the aligners were in place. The circuit board is pushed forwardly until it abuts a forward stop 160 of the board retainer. The pressing mechanism is then operated to push down the pressing bar 96, which presses down the connector 14 to push its pegs 34 against the forming tips 52. It is noted that the press includes vertical stops 108 (FIG. 2) which limit how far down the support guides 62, 64 will move. The stops are set so at the downward position of the pressing bar 96, there will be a slight gap G (FIG. 5) between the upper end 164 of the forming tip and the lower face 18 of the circuit board. Such slight spacing is desirable to avoid heat damage to the circuit board, especially at locations where there is no peg projecting through a peg hole of the circuit board.

In a commonly used design for connectors and circuit boards, each of the peg holes has a diameter H (FIG. 7) of 2.05 mm, and the axes 134 of the peg holes are spaced 3 mm from the board edge 20. The centers of adjacent peg holes are spaced apart a distance of 12 mm. The arbor stop is set so the gap G (FIG. 5) is 0.05 mm.

Although it is useful to mount two aligners 110, 112 (FIG. 6) on the circuit board to align two peg holes with two forming tips, it is possible to use a single aligner 110. Also, it is possible to sidewardly locate the circuit board along only one of its edges such as 80, so only one of the bases has to be movable. However, it is usually easier to use two aligners and to locate the circuit board along both of its side edges. It is also possible for the press to include a single board support guide platform that can be depressed against a spring force, with spaced support guide portions for supporting opposite side portions of a circuit board, and with a cutout at the middle of its front where the connector pegs project down. Such single platform preferably includes a cutout section in the center to receive any circuit board components mounted on the bottom of the board.

Thus, the invention provides a heat stake press and alignment apparatus usable with a circuit board to be placed in the press, which lowers the cost of the press and enables rapid and accurate alignment of a circuit board with forming tips of the press. The press includes a pair of sidewardly spaced board support guides with upwardly-facing surfaces that can support opposite edge portions of a circuit board. A row of forming tips lies below the level of the support surfaces. A circuit board and connector thereon can be installed in the press with the lower ends of connector pegs lying above the forming tips. A pressing mechanism can be operated to lower an arbor, whose lower end presses down against the top of the connector to push down the connector and circuit board, until the pegs push down against the hot forming tips to heat stake the pegs. During such downward movement of the circuit board, the board guides also move down, as they are each guided in vertical movement and are each upwardly biased toward a position where the support surface and the bottoms of the pegs will lie above the forming tips. The support guides are mounted on bases that can move together and apart, so a board edge guide on each support guide can abut a side edge of the circuit board to keep it accurately aligned with the forming tips. Accurate alignment is facilitated by the use of aligners that can each be mounted on the circuit board in alignment with a peg hole. Each aligner has a slot opening in a forward direction, which can receive a forming tip, to accurately sidewardly align the circuit board with the forming tip. With the aligner holding the circuit board peg holes in alignment with the forming tips, the bases can be moved sidewardly to abut the side edges of the circuit board.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A method for fixing a connector to a circuit board where the board has a forward edge and a plurality of peg holes spaced along a row line that extends parallel to said forward edge, where the connector has a main housing with a housing bottom for lying on an upper surface of the board and a housing top spaced above the housing bottom, and where the connector housing also includes a plurality of heat deformable pegs for projecting down through holes in the board with each peg having a projecting peg portion projecting below a lower surface of the board, by pressing the projecting peg portions against heated forming tips, including placing said connector on said board with said bottom of said main housing lying on said board upper surface and said pegs projecting through and below said board, the method comprising:

placing said circuit board on support guides of a heat stake press, so that the board lower surface lies on horizontal support surfaces of said support guides and said pegs lie directly over a row of heated forming tips of said press, while upwardly biasing said guides so said pegs initially lie spaced above said forming tips;

applying downward force to said connector top in an amount that is sufficient to overcome said upward biasing, and moving down said guides and board until said projecting peg portions press downward against said heated forming tips and cause said forming tips to deform said peg projecting portions.

2. Alignment apparatus for use with a heat stake press that has a frame and a plurality of heatable forming tips mounted on said frame in a sidewardly-extending row to assure that a row of peg holes spaced along a forward edge portion of a circuit board that has a forward edge, will be accurately aligned with said forming tips, the apparatus comprising:

at least one aligner which is mountable on said board, said aligner having a pin that is constructed to be closely received in one of said board peg holes to accurately position said aligner on the board, said aligner having a slot that is sidewardly aligned with said pin and that has a forwardly facing open end for closely receiving one of said forming tips when said board with said aligner thereon is slid forwardly toward said forming tips.

3. The apparatus described in claim 2 wherein:

said slot has a rearward end with walls lying on an imaginary circle of the diameter of one of said forming tips, with said circle lying coaxial with said pin to lie coaxial with a peg hole of the circuit hole.

4. The apparatus described in claim 2 wherein:

said aligner has a board-receiving groove with a front end positioned to substantially abut said board forward edge and fix the orientation of said aligner about the axis of the corresponding board hole, with said slot positioned to open in said forward direction when said groove rear wall abuts said board forward edge.

5. A heat stake press for heat staking plastic pegs that extend from a main connector housing through holes of a row of board holes in a circuit board that has opposite board side portions, wherein said pegs have projecting ends that project from the lower board surface, wherein the press includes a row of heatable forming tips and includes support apparatus for supporting the board with the pegs aligned with the forming tips and for bringing the peg projecting ends against the forming tips, wherein:

said support apparatus includes a support platform having a pair of support guide portions, said guide portions each having an upper board-supporting surface for supporting a different one of said opposite side portions of the circuit board, said support apparatus including a base structure, a vertical guider which guides said support platform in vertical motion on said base structure, and a spring device which urges said support structure upwardly;

said heat stake press includes a pressing mechanism with an arbor having an end initially lying above the level of the board-supporting surfaces of said support guides with at least a portion of said arbor end lying above and sidewardly between said board-supporting surfaces, and said pressing mechanism being operable to press down a connector lying on a circuit board which has opposite sides lying on said board-supporting surfaces.

6. The press described in claim 5 wherein:

said support guide portions each comprise a separate support guide that each has a board retainer and has an edge guide which is positioned to abut a corresponding side edge of the circuit board;

said base structure includes two bases, each guiding one of said support guides in vertical motion;

said support apparatus comprises a horizontal guider that includes a pair of horizontally-extending bars with each of said bases being slidable on said bars, said spring device includes a pair of springs each urging a different one of said support guides upwardly, and including a pair of locks each locking a different one of said bases along said bars.

7. A method for positioning a pair of support guides that each is sidewardly slidable and is fixable in a chosen sideward position on a housing to assure that said support guide will properly position sidewardly spaced opposite side edges of a circuit board, wherein said circuit board has peg holes spaced along a board forward edge portion that must be accurately aligned with heat stake forming tips, the method comprising:

maintaining at least one aligner in at least one of said peg holes, where said aligner has a pin portion which is closely received in said peg hole, and said aligner has a tip-receiving slot that is constructed to closely receive one of said forming tips;

sliding said circuit board forwardly and shifting said board sidewardly until said aligner slot receives one of said forming tips; and with said aligner slot receiving a tip, shifting said support guides until edge guides on said support guides abut said board opposite sides, and then fixing the sideward positions of said support guides on said housing.

8. The method described in claim 7 wherein:

said aligner has a rearward end and has a groove extending therein, said groove having a forward end, and said step of mounting includes inserting said board forward edge into said groove and substantially against said groove forward end to orient said aligner so said slot opens in a forward direction.

9. The method described in claim 1 including:

before placing said connector on said board, attaching at least one aligner to said board, with said aligner having a lower portion forming a forwardly-opening slot that can closely receive one of said forming tips at a final position wherein the forming tip is aligned with one of said peg holes, and then laying said board on said support guides and moving said board forwardly and with a sideward adjustment until said aligner slot receives one of said forming tips, and then moving at least one side edge guide of said press sidewardly until it abuts one of said board side edges and fixing the sideward position of said side edge guide; and wherein said step of placing said board on said support guides includes locating a side edge of said board against said side edge guide.

10. The combination of a heat stake press that has a frame and a plurality of heatable forming tips mounted on said frame in a sidewardly-extending row, and alignment apparatus for assuring that a row of peg holes spaced along a forward edge portion of a circuit board that has a forward edge, will be accurately aligned with said forming tips, comprising:

at least one aligner which is mountable on said board, said aligner having a pin that is constructed to be closely received in one of said board peg holes to accurately position said aligner on the board, said aligner having a slot that is sidewardly aligned with said pin and that has a forwardly facing open end for closely receiving one of said forming tips when said board with said aligner thereon is slid forwardly toward said forming tips;

said press has a pair of board support guides that support a lower face of said board in a predetermined plane that is spaced a predetermined distance from said forming tips, with said distance being greater than the distance of projection of said pegs from said board lower surface in a quiescent state of said press, and said aligner slot has a portion that extends further downward from said board lower face than said pegs, and further than said tip distance.

11. The combination described in claim 10, wherein said board has upper and lower faces and parallel opposite side edges, and wherein:

said press includes first and second board support guides, each guide having a support surface for supporting said board lower surface and each support guide having a board retainer and having an edge guide positioned to abut a corresponding one of said board side edges and guide it in forward movement, with each board retainer having a forward stop positioned to limit forward movement of the board;

at least said first guide being movable continuously toward and away from said second guide, and including a guide lock that fixes the relative spacing of said guides.

* * * * *